United States Patent [19]

Kumar et al.

[11] Patent Number: 4,981,648
[45] Date of Patent: Jan. 1, 1991

[54] INHIBITING CORROSION IN AQUEOUS SYSTEMS

[75] Inventors: Ranjit Kumar, Columbia; Charles G. Carter, Silver Spring, both of Md.

[73] Assignee: W. R. Grace & Co.-Conn., New York, N.Y.

[21] Appl. No.: 269,210
[22] Filed: Nov. 9, 1988
[51] Int. Cl.$^5$ .................... C23F 11/16; C23F 11/00
[52] U.S. Cl. ................................. 422/15; 422/7; 422/14
[58] Field of Search .................. 422/15, 18, 7, 14

[56] References Cited

U.S. PATENT DOCUMENTS

| | | | |
|---|---|---|---|
| 2,535,172 | 12/1950 | Tawney | 558/183 |
| 2,632,767 | 3/1953 | Smith et al. | 558/164 |
| 2,900,408 | 8/1959 | Blaser et al. | 558/116 |
| 3,032,578 | 5/1962 | MacMullen et al. | 558/186 |
| 3,341,467 | 9/1967 | Hwa | 252/321 |
| 3,429,824 | 2/1969 | Tate | 252/180 |
| 3,431,217 | 3/1969 | Hwa | 422/15 |
| 3,488,289 | 1/1970 | Tate | 252/180 |
| 3,510,436 | 5/1970 | Silverstein et al. | 252/389 |
| 3,532,639 | 10/1970 | Hatch | 252/389 |
| 3,600,470 | 8/1971 | Lewis | 558/124 |
| 3,714,066 | 1/1973 | King et al. | 252/389 |
| 3,723,333 | 3/1973 | Von Freyhold | 422/15 |
| 3,738,806 | 6/1973 | Feiler | 21/27 |
| 3,803,047 | 4/1974 | Hwa | 252/389 A |
| 3,803,048 | 4/1974 | Hwa | 252/389 A |
| 3,837,803 | 9/1974 | Carter et al. | 252/389 A |
| 3,890,228 | 6/1975 | Hwa et al. | 252/180 |
| 3,960,576 | 6/1976 | Carter et al. | 252/389 A |
| 3,970,729 | 7/1976 | Walsh et al. | 558/104 |
| 4,003,842 | 1/1977 | Suen et al. | 252/175 |
| 4,029,696 | 6/1977 | Sommer et al. | 260/502.5 |
| 4,052,160 | 10/1977 | Cook et al. | 106/14 |
| 4,056,480 | 11/1977 | Herber | 252/78.5 |
| 4,069,247 | 1/1978 | Kleiner | 260/502.4 R |
| 4,085,134 | 4/1978 | Redmore et al. | 260/502.5 |
| 4,092,244 | 5/1978 | Suen et al. | 252/170 |
| 4,206,075 | 6/1980 | Boffardi | 252/389 A |
| 4,209,487 | 6/1980 | Hogue et al. | 422/12 |
| 4,212,832 | 7/1980 | Mitschke et al. | 558/162 |
| 4,246,103 | 1/1981 | Block et al. | 422/15 |
| 4,276,089 | 6/1981 | Moran | 106/14.12 |
| 4,416,830 | 11/1983 | Morr et al. | 558/164 |
| 4,440,646 | 4/1984 | Budnick | 260/502.4 R |
| 4,465,516 | 8/1984 | Danner et al. | 106/14.12 |
| 4,717,542 | 1/1988 | Mitchell | 422/15 |
| 4,719,031 | 1/1988 | Coleman | 260/545 P |
| 4,911,887 | 3/1990 | Carter | 422/15 |

OTHER PUBLICATIONS

J. S. Amato et al., "A New Preparation of Chloromethyl Methyl Ether Free of Bis[chloromethyl] Ether", Synthesis, 970–971, (1979).
T. H. Chan et al., "Unexpected Site Selectivity of Halotrimethylsilane with 2,5-Dimethoxytetrahydrofuran and 2,6-Dimethoxytetrahydropyran", Tet. Lett., 24, 1225–1228, (1983).
Griffiths et al., "The Reaction of Phosphorus Trichloride and Paraformaldehyde", Phosphorous, 6, 223–230, (1976).
K. A. Petrov et al., "Synthesis and Properties of (Substituted Methyl) Phosphonates", Zhur. Obschchei.
Khim., 12, 2741-9, (1977), (1978 Translation Plenum Publishing Corp., 2494-2501).
D. P. Phillion et al., "Synthesis and Reactivity of Diethyl Phosphonomethyltriflate", Tet. Lett., 27, 1477–1480, (1986).
D. Redmore, "Heterocuclic Systems Bearing Phosphorus Substituents. Synthesis and Chemistry", Chem. Rev., 71, 315–337 (1971) and Table III.
L. Maier et al., "Organic Phosphorus Compounds. 70. Preparation and Properties of New Phosphorus Containing Chelating Agents for Calcium and Magnesium Ions", Phosphorous and Sulfur, 5, 45–51, (1978).
Chem. Abstracts, vol. 96, entry 183846E, (1986); Stulli et al.: "Effect of Complexing Agents on the Properties of Synthetic Cutting Fluids", Khim. Tekhnol. Topl. Masel.
Chem. Abstracts, vol. 95, entry 61756j, (1981)—Jupe et al., "Polyhydric Phenols", Ger. Offen., 2,942,366.
D. A. Nicholson et al., "A Convenient Method of Esterfication of Polyphosphonic Acids", Journal of Organic Chemistry, 35, 3149–3150, (1970).
Chemical Abstracts, vol. 37, cols. 3048–3049, (1943), V. S. Abramov et al., "Action of Dibromomethyl and Dichloromethyl Ethers on Ethyl Phosphite and Sodium Diethyl Phosphite".
Chemical Abstracts, vol. 55, col. 6367, (1961), K. A. Petrov et al., "Diphosphonates. III. Synthesis of O- and S-Diphosphonates", Zhur. Obshchei Khim., 30, 1960–64, (1960).
Chemical Abstracts, vol. 56, cols. 11418–11419, (1962), W. Treibs et al., "Autooxidation in the Presence of Alcohols and Protons III. Autooxidation of Cyclenes, Hydroarenes, and Hydroheterocycles", Chem. Ber., 94, 2983–2989, (1961).
Chemical Abstracts, vol. 58, cols. 6866–6868, (1963), S. Julia et al., "Sythesis of Substituted α- and β-Cyclohomocitrals and the Corresponding Ketones and Alcohols", Bull. Soc. Chim. Grance, 1952–1959, (1962).
Stauffer Chemical Company, Flame Retardant Chemical Product Data—Hydroxymethyl Phosphonic Acid.
Stauffer Chemical Company, Material Safety Data Sheet, Hydromethylphosphonic Acid.

Primary Examiner—Robert J. Warden
Assistant Examiner—Theresa A. Trembley
Attorney, Agent, or Firm—James P. Barr

[57] ABSTRACT

A process is disclosed for inhibiting corrosion of an iron based metal in contact with the system water in an aqueous system, which comprises incorporating into the system water an effective amount of bis-phosphonic acid ethers selected from the group consisting of compounds having the formula $(HO)_2OP-R-(OR'-)_n-OR-PO(OH)_2$ wherein each R is independently selected from the group consisting of methylene and ethylene, wherein R' is selected from the group consisting of methylene, ethylene and ethylene substituted with one or more methyl groups and wherein n is an integer from 0 to 4, and water soluble salts of said bis-phosphonic acid ethers. Advantageous corrosion inhibition using the bis-phosphonic acid ethers in combination with hydroxymethylphosphonic acid is also disclosed.

24 Claims, No Drawings

INHIBITING CORROSION IN AQUEOUS SYSTEMS

FIELD OF THE INVENTION

The present invention relates to the inhibiting and preventing corrosion of iron based metals which are in contact with the system water in aqueous systems, such as cooling water systems.

BACKGROUND OF THE INVENTION

Iron and iron metal containing alloys such as mild steel are well-known materials used in constructing the apparatus of aqueous systems in which system water circulates, contacts the iron based metal surface, and may be concentrated, such as by evaporation of a portion of the water from the system. Even though such metals are readily subject to corrosion in such environments, they are used over other metals due to their strength and availability.

It is known that various materials which are naturally or synthetically occurring in the aqueous systems, especially systems using water derived from natural resources such as seawater, rivers, lakes and the like, attack iron based metals (the term "iron based metals" shall mean in the present disclosure and the appended claims iron metal and metal alloys containing iron therein, i.e. ferrous metals). Typical devices in which the iron metal parts are subject to corrosion include evaporators, single and multi-pass heat exchangers, cooling towers, and associated equipment and the like. As the system water passes through or over the device, a portion of the system water evaporates causing a concentration of the dissolved materials contained in the system. These materials approach and reach a concentration at which they may cause severe pitting and corrosion which eventually requires replacement of the metal parts. Various corrosion inhibitors have been previously used.

Chromates and inorganic polyphosphates have been used in the past to inhibit the corrosion of metals which is experienced when the metals are brought into contact with water. The chromates, though effective, are highly toxic and, consequently, present handling and disposal problems. The polyphosphates are relatively non-toxic, but tend to hydrolyze to form orthophosphate which in turn can create scale and sludge problems in aqueous systems. Moreover, where there is concern over eutrophication of receiving waters, excess phosphate compounds can provide disposal problems as nutrient sources. Borates, nitrates, and nitrites have also been used for corrosion inhibition. These too can serve as nutrients in low concentrations, and represent potential health concerns at high concentrations. In addition, environmental considerations have also recently increased concerns over the discharge of other metals such as zinc, which previously were considered acceptable for water treatment.

Much recent research has concerned development of organic corrosion inhibitors which can reduce reliance on the traditional inorganic inhibitors. Among the organic inhibitors successfully employed are numerous organic phosphonates. These compounds may generally be used without detrimental interference from other conventional water treatment additives.

SUMMARY OF THE INVENTION

We have found that the corrosion of iron-based metals in contact with the system water in an aqueous system can be inhibited by incorporating into the system water an effective amount of bis-phosphonic acid ethers selected from the group consisting of compounds having the formula $(HO)_2OP-R-(OR'-)_n-OR-PO(OH)_2$ wherein each R is independently selected from the group consisting of methylene and ethylene, wherein R' is selected from the group consisting of methylene, ethylene, and ethylene substituted with one or more methyl groups, and wherein n is an integer from 0 to 4, and water soluble salts of said bis-phosphonic acid ethers. Advantageous combinations of said compounds with hydroxymethylphosphonic acid and its water-soluble salts are also disclosed.

It is an object of this invention to provide a novel process for inhibiting the corrosion of iron-based metal in aqueous systems.

This and other objects of this invention will become apparent from the detailed description which follows.

DETAILED DESCRIPTION

This invention relates to a novel process for inhibiting the corrosion of metals in contact with the system water in an aqueous system by adding to said system water at least one compound selected from the group consisting of those bis-phosphonic acid ethers having the formula:

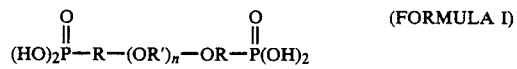

(FORMULA I)

wherein each R is independently selected from the group consisting of methylene (i.e. $-CH_2-$) and ethylene (i.e. $-CH_2CH_2-$), wherein R' is selected from the group consisting of methylene, ethylene, and ethylene substituted with one or more methyl groups (e.g. $-CHC(CH_3)H-$), and wherein n is an integer from 0 to 4, and water soluble salts of said bis-phosphonic acid ethers.

Bis-phosphonic acid ethers of Formula I wherein n is 1 and R' is ethylene or ethylene substituted with one or more methyl groups may be prepared in accordance with the method disclosed in copending U.S. patent application Ser. No. 269,205 filed simultaneously herewith, which is hereby incorporated by reference. The method comprises the steps of (a) reacting (i) a hydroxyalkylphosphonic acid dialkyl ester component of the formula $MOR-PO(OR'')_2$ where R is as recited above, R'' is an alkyl group having from 1 to 6 carbons, and M is an alkali metal or an alkaline earth metal, with (ii) a compound selected from the group consisting of 2-benzyloxyalkyl p-toluenesulfonate, 2-benzyloxyalkyl benzenesulfonate and 2-benzyloxyalkyl alkylsulfonate to form a first intermediate, the alkyl group of said alkylsulfonate having from about 1 to 6 carbon atoms, the oxyalkyl group of said sulfonate corresponding to the formula OR' where R' is selected from the group consisting of $-CH_2CH_2-$, and $-CH_2CH_2-$ which is substituted with one or more methyl groups, and the benzene ring of the benzyl group of said sulfonate being optionally substituted with one or more substituents selected from the group consisting of halogen groups, alkyl groups having from 1 to 30 carbon atoms and alkoxy groups having from about 1 to 30 carbon atoms;

(b) reacting said first intermediate with hydrogen or a hydrogen source to form a second intermediate; (c) reacting said second intermediate with a hydrogen ion acceptor and a compound selected from the group consisting of toluene sulfonyl chloride, benzene sulfonyl chloride, and alkane sulfonyl chlorides having from 1 to about 6 carbon atoms to form a third intermediate; (d) reacting said third intermediate with a hydroxyalkylphosphonic acid dialkyl ester compound of the formula MOR—PO(OR")$_2$, where R, R" and M are as recited above; and (e) hydrolyzing the reaction product of step (d) to form a polyether bis-phosphonic acid.

An example is disclosed in U.S. patent application Ser. No. 269,205. To a slurry of sodium hydride (0.4 g, 17 mmol) in 20 ml ethylene glycol dimethyl ether cooled with an ice bath under an atmosphere of nitrogen, a solution of 2-benzyloxyethanol (2.1 ml, 15 mmol) and p-toluene sulfonyl chloride (2.9 g, 15 mmol) in ethylene glycol dimethyl ether was added dropwise. When the addition was complete, the ice bath was removed and the solution stirred at room temperature for 18 hours. After dilution with diethyl ether, the resulting slurry was filtered through anhydrous magnesium sulfate and concentrated under vacuum to yield 3.6 g of crude 2-benzyloxyethyl p-toluenesulfonate.

Crude 2-benzyloxyethyl p-toluenesulfonate prepared in this manner(3.6 g, 12 mmol) was dissolved in 20 ml ethylene glycol dimethyl ether together with diethyl hydroxymethylphosphonate (1.65 g, 10 mmol). The resulting solution was added dropwise to a slurry of sodium hydride (0.4 g, 17 mmol) in 20 ml ethylene glycol dimethyl ether at 0° C. under a nitrogen atmosphere. The reaction mixture was allowed to warm to room temperature and stirred for 3.5 days. The mixture was diluted with diethyl ether, filtered through magnesium sulfate and concentrated under vacuum to give 2.5 g of a clear liquid. Purification by silica gel chromatography gave 1.0 g of diethyl 2-(benzyloxy)ethoxymethylphosphonate.

Palladium on carbon (10%, 100 mg) was added to a solution of diethyl 2-(benzyloxy)ethoxymethylphosphonate prepared in this manner (0.9 g, 2.8 mmol) and cyclohexene (2.0 ml, 20 mmol) in 20 ml ethanol under a nitrogen atmosphere. The resulting slurry was heated to reflux overnight. The catalyst was filtered off and the solution concentrated under vacuum to yield 0.5 g of diethyl 2-hydroxyethoxymethylphosphonate.

Diethyl 2-hydroxyethoxymethylphosphonate prepared in this manner (2.5 g, 12mmol) was dissolved in 13 ml dichloromethane under a nitrogen atmosphere. p-Toluenesulfonyl chloride (2.7 g, 14 mmol) was added and a solution of pyridine (2.3 ml, 28 mmol) in 7 ml dichloromethane was added dropwise After stirring for three days at room temperature, the mixture was diluted with dichloromethane and washed successively with water, 1N hydrochloric acid, 5% sodium bicarbonate and saturated sodium chloride. After drying over anhydrous magnesium sulfate, the organic phase was concentrated under vacuum to yield 3.3 g of a cloudy liquid. Purification by silica gel chromatography yielded 0.7 g of diethyl 2-(phosphonomethoxy)ethyl p-toluene sulfonate.

Diethyl 2-(phosphonomethoxy)ethyl p-toluene sulfonate prepared in this manner (0.5 g, 1.4 mmol) was dissolved in 5 ml ethylene glycol dimethyl ether together with diethyl hydroxymethylphosphonate (0.3 g, 2 mmol). This solution was added dropwise to an ice cooled slurry of sodium hydride (0.06 g, 2 mmol) in 5 ml ethylene glycol dimethyl ether under a nitrogen atmosphere. The mixture was stirred at room temperature for 25 hours, refluxed for 4.5 hours and stirred another 19.5 hours at room temperature. During this period of time an additional 1.0 mmol diethyl hydroxymethylphosphonate and 0.09 g sodium hydride were introduced into the reaction. The mixture was then diluted with diethyl ether, filtered through celite and concentrated under vacuum to give 0.3 g of crude tetraethyl ethyleneglycol di-(phosphonomethyl) ether.

Tetraethyl ethylene glycol di-(phosphonomethyl) ether prepared in this manner (1.2 g, 3.3 mmol) in 15 ml concentrated hydrochloric acid was heated to reflux for 3 hours. An additional 5 ml of acid was added and the reflux continued for another 7.5 hours. After standing overnight at room temperature, the solution was concentrated under vacuum. The residue was dissolved in water and washed with hexane. Concentration under vacuum gave 0.6 g of ethyleneglycol di-(phosphonomethyl) ether (i.e. "EDPME"). The structure of the ethyleneglycol di-(phosphonomethyl) ether was verified by nuclear magnetic resonance spectroscopy (carbon-13, proton, and phosphorous) as well as fast atom bombardment mass spectrometry.

It will be evident to those skilled in the art that other bis-phosphonic acid ethers of Formula I can be produced in an analogous manner.

Bis-phosphonic acid ethers of Formula I wherein R' is ethylene or ethylene substituted with one or more methyl groups, and n is 2 or more may be prepared in accordance with another method disclosed in copending U.S. patent application Ser. No. 269,205. This method involves reacting a hydroxyalkyl phosphonic acid dialkyl ester compound of the above-referenced formula with a dihalogenated ether of the formula X—R'—(OR')$_{n-1}$—X, where R' and n are as recited above, and X is selected from the group consisting of chlorine, bromine, and iodine, to form the respective tetraalkyl ester of the bis-phosphonic acid ether; and then dissolving said tetraalkyl ester in a concentrated acid such as hydrochloric acid and refluxing the acid solution to produce the bis-phosphonic acid.

An example is disclosed in U.S. patent application Ser. No. 269,205. Sodium hydride (0.24 g, 10 mmol) was slurried in 8 ml ethylene glycol dimethyl ether under a nitrogen atmosphere. The reaction was cooled with an ice bath and a solution of bis-(2-bromoethyl) ether (1.0 g, 4.0 mmol) and diethyl hydroxymethylphosphonate (1.5, 8.0 mmol) in 7 ml ethylene glycol dimethyl ether was added dropwise. Upon completion of the addition, the ice bath was removed and the reaction allowed to stir at room temperature for 3.5 hours. At this point another 0.2 g(1 mmol) of the diethyl phosphonate and 0.05 g(2 mmol) of sodium hydride were added. After stirring for another 18.5 hours at room temperature, the reaction was diluted with ether and filtered through celite. The solution was concentrated and purified on a silica gel column to give 0.5 g of tetraethyl bis-(2-phosphonomethoxyethyl) ether.

A solution of 4.1 g (10 mmol) of the tetraethyl bis-(2-phosphonomethoxyethyl) ether prepared in this manner in 15 ml concentrated hydrochloric acid (conc. HCl) was heated to reflux for 3.5 hours. Another 15 ml of concentrated HCl was added and the solution refluxed another 2.0 Hours. After standing overnight at room temperature, the mixture was refluxed an additional 3.0 hours. It was then concentrated under vacuum and dried in a vacuum oven at 80° C. for three days to yield 2.9 g of a viscous oil. Examination by nuclear magnetic resonance spectroscopy (carbon-13, proton, and phosphorous) showed the product to be the desired bis-(2-phosphonomethoxyethyl) ether, (i.e. "BPMEE") contaminated with 10% hydroxymethylphosphonic acid. The molecular weight of the product was confirmed by fast atom bombardment mass spectrometry.

It will be evident to those skilled in the art that other bis-phosphonic acid ethers of Formula I can be produced in an analogous manner.

Bis-phosphonic acid ethers of Formula I wherein n is 1 and both R and R' are methylene may be prepared in accordance with the method disclosed in copending U.S. patent application Ser. No. 269,209 filed simultaneously herewith which is hereby incorporated by reference. The method comprises the steps of (a) forming an intimate mixture of a first component consisting of hydroxymethylphosphonic acid and a second component selected from the group consisting of formaldehyde and formaldehyde polymers such as trioxane and paraformaldehyde; said intimate mixture having at least about 0.5 equivalents of formaldehyde per equivalent of hydroxymethylphosphonic acid; and (b) subjecting the intimate mixture formed in step (a) to a temperature of between about 100° C. and 180° C. for a time sufficient to allow the first and second components to react to form a reacted mixture comprising di-(phosphonomethyl) formal (i.e. "DPMF").

An example is disclosed in U.S. patent application Ser. No. 269,209. No. 01-7190. Hydroxymethylphosphonic acid (100 g, 0.89 mol; and believed to contain minor amounts of chloromethylphosphonic acid as an impurity) and paraformaldehyde (28 g, 0.93 mol) were ground together with a mortar and pestle. The resultant mixture was transferred to a flask and maintained under an inert atmosphere of argon. The mixture was then mechanically stirred and heated for four hours so as to maintain an internal temperature of 90°–95° C. using an oil bath, allowing the components to react. As the reaction progressed, a large quantity of the paraformaldehyde was observed sublimed onto the upper parts of the apparatus. The reacted mixture was an amber solution which was cooled and then decanted away from the unreacted paraformaldehyde to give a viscous oil which solidified to a waxy solid on standing. The solid composition was analyzed by carbon-13, phosphorous-31 and proton nuclear magnetic resonance spectroscopy; and found to comprise about 60 weight percent di-(phosphonomethyl) formal and about 35 weight percent hydroxymethylphosphonic acid, with the remainder considered to be principally chloromethylphosphonic acid which was attributable to the impurity of the hydroxymethylphosphonic acid starting material. In other words about 59 percent of the phosphorous was found to be present as di(phosphonomethyl) formal and about 36 percent of the phosphorous was found to be present as hydroxymethylphosphonic acid.

A bis-phosphonic acid ether of Formula I where n is zero and R is methylene may be prepared in accordance with the following. A slurry of 0.22 g (7.2 mmol) sodium hydride in 4 ml ethyleneglycol dimethyl ether was maintained under an atmosphere of nitrogen and cooled with an ice bath. A solution of 1.0 g (6.0 mmol) diethyl hydroxymethylphosphonate in 3 ml ethyleneglycol dimethyl ether was added dropwise. The reaction mixture was stirred until hydrogen evolution ceased yielding a solution of the sodium salt of diethyl hydroxymethylphosphonate. A solution of 1.8 g (6.0 mmol) of the trifluoromethanesulfonate of diethyl hydroxymethylphosphonate in 3 ml ethyleneglycol dimethyl ether was then added dropwise. When addition was complete, the ice bath was removed and the reaction mixture was allowed to stir at room temperature. Analysis by gas chromatography showed that the reaction was essentially complete after one hour. The mixture was allowed to stir at room temperature under a nitrogen atmosphere overnight (16 hours). The mixture was then concentrated under vacuum and diluted with dichloromethane. The resulting solution was washed with a saturated aqueous solution of sodium bicarbonate. The bicarbonate wash was back extracted twice with dichloromethane. The combined dichloromethane fractions were dried over anhydrous sodium sulfate, filtered and concentrated under vacuum to yield 1.4 g of a colorless liquid. The product was identified by mass spectrometry and nuclear magnetic resonance spectroscopy (phosphorus and proton) as tetraethyl di-(phosphonomethyl) ether. Tetraethyl di-(phosphonomethyl) ester (2.4 g, 7.5 mmol) prepared in this manner was heated to reflux in 25 ml of concentrated hydrochloric acid for 3.5 hours. The volatile components of the mixture were removed under vacuum. A second portion of hydrochloric acid was added and the process was repeated The volatiles were again removed leaving a viscous oil which was identified as bis-(phosphonomethyl) ether (i.e. "BPME") by nuclear magnetic resonance spectroscopy.

Bis-phosphonic acid ethers of Formula I wherein n is zero and R is ethylene may be prepared in accordance with the following. Bis-(2-phosphonoethyl) ether may be prepared by the Michaelis-Arbuzov reaction of triisopropyl phosphite and bis-(2-bromoethyl) ether as disclosed, for example, in D. Redmore, Chem. Rev., vol. 71, p. 317 (1971), followed by hydrolysis of the resulting phosphonate ester with concentrated hydrochloric acid. (See also L. Maier and M. M. Crutchfield, Phosphorous and Sulfur, vo. 5, pp. 45–51 (1978)).

As an example, a mixture of 150 ml of 90% triisopropyl phosphite (548 mmol) and 59.5 g (249 mmol) bis-(2-bromoethyl) ether was heated to reflux under a nitrogen atmosphere for 4.5 hours. The isopropyl bromide formed as a byproduct was distilled off by means of a Deen-Stark trap during the course of the reaction. Excess triisopropyl phosphite and other volatile impurities were then removed via bulb-to-bulb vacuum distillation leaving 96.7 g of an orange oil. Concentrated hydrochloric acid (100 ml) was then added to the oil and the resulting mixture was heated to reflux for 1.5 hours, and then concentrated under vacuum. A second aliquot of hydrochloric acid was added and the reflux and concentration steps were repeated. The resulting product was filtered through celite and concentrated under vacuum to give an amber oil which was identified as bis-(2-phosphonoethyl) ether ("BPEE") by proton and phosphorous nuclear magnetic resonance spectroscopy.

In accordance with this invention, corrosion of iron-based metals which are in contact with the system water in aqueous systems may be inhibited by adding an effective amount of the bis-phosphonic acid ethers of the invention (or their water-soluble salts) to the system water. The bis-phosphonic acid ethers and their alkali metal salts are preferred for this purpose. The precise dosage of the bis-phosphonic acid ether or salt thereof depends, to some extent, on the nature of the aqueous system in which it is to be incorporated and the degree of protection desired. In general, however, it can be said the concentration maintained in the system water can be from about 0.5 to about 10,000 ppm. Within this range, generally low dosages of from about 1 to about 100 ppm are normally sufficient, and even a comparatively low dosage of from about 1 to about 50 ppm substantially inhibits corrosion in aqueous systems such as cooling water systems. The exact amount required with respect to a particular aqueous system can be readily determined in conventional manners. As with most aqueous systems, the pH is preferably maintained at 7 or above, and most preferably at 8 or above.

The bis-phosphonic acid ether or salt thereof may be added to the system water coming in contact with the metal surfaces of an apparatus by any convenient mode, such as by first forming a concentrated solution of the bis-phosphonic acid ether or salt with water (preferably containing between 1 and 50 total weight percent of the bis-phosphonic acid ethers) and then feeding the concentrated solution to the system water at some convenient point in the system.

The corrosion inhibition achieved by this invention is particularly suited for cooling water systems and the like in which the system water is substantially free of chromate. The corrosion inhibiting bis-phosphonic acid ethers and their salts can be used effectively without the presence of any or all of polyphosphate, nitrate, nitrite, borate or other ferrous metal corrosion inhibitors such as zinc. The combination will also function without phosphate and thus should reduce reliance upon phosphate as a corrosion inhibiting agent as well. However, it should be anticipated that the bis-phosphonic acid ethers and salts of this invention may, like many phosphonates, eventually degrade, releasing phosphate at a rate dependent upon the conditions and chemistry of the system.

The bis-phosphonic acids of this invention are especially effective in portions of the systems where the treated water is flowing past the metal surfaces.

Practice of the invention will become further apparent from the following non-limiting examples.

EXAMPLE I

A standard corrosive test water solution containing 30 milligrams per liter (mg/l) calcium chloride, 37 mg/l magnesium sulfate, 100 mg/l sodium sulfate, 50 mg/l sodium chloride and 100 mg/l sodium carbonate was prepared by adding the recited salts to distilled water. The solution was thus free of such materials as chromate, zinc, phosphate, polyphosphate, nitrite, nitrate and borate. The test solution was added to a simulated cooling water test rig having a 12 liter reservoir and a recirculation loop. The rig generally corresponded in design with that described in The Development and Use of Corrosion Inhibitors, A. Marshall and B. Greaves, Oyez, London (1983). Four precleaned and preweighed mild steel metal test coupons were immersed in the test solution within the recirculating loop, and a fifth coupon was immersed in the test solution in the reservoir. The test solution in the rig was maintained at a temperature of about 55° C., and the pH was adjusted to about 8.5 as the test began. The recirculating flow (generally about 9 liters/min) produced a water velocity of approximately 1.6 feet/sec. past the coupons in the recirculation line while the water in the reservoir was substantially quiescent.

Two of the coupons in the recirculation line were removed after only 24 hours, and the remaining coupons were removed after 48 hours. The coupons were cleaned after removal and reweighed to determine weight loss. An average corrosion rate in mils (thousandths of an inch) per year was then calculated for the four recirculation line coupons, and a corrosion rate in mils per year was separately calculated for the reservoir coupon. The corrosion rates for the standard corrosive test water solution were calculated as 186 mils per year for the recirculation line coupons and 72 mils per year for the reservoir coupon.

A second run was made using the same procedure except that 15 ppm of ethyleneglycol di-(phosphonomethyl) ether (i.e. "EDPME"), prepared generally in accordance with the procedure illustrated above, was added to the standard corrosive test water solution. The corrosion rates for the recirculation line coupons and reservoir coupon were calculated. The percent corrosion inhibition compared to the run using only the standard corrosive test water is shown in Table I.

Additional runs (runs 3, 4 and 5) respectively using EDPME at concentrations of 22 ppm, 25 ppm and 38 ppm were also made and the percent corrosion inhibition compared to the run using only the standard corrosive test water is shown in Table I.

Additional runs (runs 6 and 7) were made respectively using 25 ppm and 35 ppm of bis-(phosphonomethyl) ether (i.e. "BPME"), prepared generally in accordance with the procedure illustrated above, as the corrosion inhibitor. The percent corrosion inhibition compared to the run using only the standard corrosive test water is shown in Table I.

Additional runs (runs 8, 9, 10 and 11) were made respectively using 19 ppm, 23, ppm, 28 ppm and 38 ppm of bis-(2-phosphonoethyl) ether (i.e. "BPEE"), prepared generally in accordance with the procedure illustrated above, as the corrosion inhibitor. The percent corrosion inhibition compared to the run using only the standard corrosive test water is shown in table I.

For comparison, hydroxymethylphosphonic acid (i.e. "HMPA") was synthesized by conventional means from phosphorous acid and formaldehyde (See U. K. Patent Specification No. 1,076,244), and was tested in a series of 8 runs (runs 12 through 19). The percent corrosion inhibition using HMPA at 30 ppm (runs 12 and 13), 50 ppm (run 14), 100 ppm (runs 15, 16 and 17) and 200 ppm (runs 18 and 19) is shown in Table I.

Also for comparison, 2-phosphonobutane -1,2,4-tricarboxylic acid (i.e. "PBTA") obtained from Mobay Chemical Corporation of West Pittsburgh, Pa., and was tested in a series of two runs (runs 20 through 23). The percent corrosion inhibition using PBTA at 30 ppm (run 20), 35 ppm (run 21), 45 ppm (run 22), and 60 ppm (run 23) is shown in Table I.

TABLE I

| Run No. | Corrosion Inhibitor | Inhibitor Dosage (ppm) | Percent Reduction in Corrosion Rate | |
|---|---|---|---|---|
| | | | Recirculation Line | Reservoir |
| 1 | None | 0 | 0 (Base Rate) | 0 (Base Rate) |
| 2 | EDPME | 15 | 70 | 35 |
| 3 | EDPME | 22 | 85 | 19 |
| 4 | EDPME | 25 | 90 | 32 |
| 5 | EDPME | 38 | 99 | 98 |
| 6 | BPME* | 25 | 61 | 33 |
| 7 | BPME* | 35 | 92 | 32 |
| 8 | BPEE | 19 | 72 | 32 |
| 9 | BPEE* | 23 | 58 | 29 |
| 10 | BPEE | 28 | 99 | 44 |
| 11 | BPEE | 38 | 99 | 94 |
| 12 | HMPA | 30 | 49 | 43 |

TABLE I-continued

| Run No. | Corrosion Inhibitor | Inhibitor Dosage (ppm) | Percent Reduction in Corrosion Rate | |
|---|---|---|---|---|
| | | | Recirculation Line | Reservoir |
| 13 | HMPA | 30 | 46 | 41 |
| 14 | HMPA | 50 | 72 | 26 |
| 15 | HMPA | 100 | 96 | 56 |
| 16 | HMPA | 100 | 93 | 37 |
| 17 | HMPA | 100 | 94 | 43 |
| 18 | HMPA | 200 | 99 | 62 |
| 19 | HMPA | 200 | 98 | 75 |
| 20 | PBTA | 30 | 69 | 29 |
| 21 | PBTA | 35 | 89 | 18 |
| 22 | PBTA | 45 | 99 | 57 |
| 23 | PBTA | 60 | 99 | 90 |

*Recirculation flow rate 12 liters/min

It will be appreciated that while the bis-phosphonic acid ethers of this invention may be used as the sole corrosion inhibitor for an aqueous system, other ingredients customarily employed in aqueous systems of the type treated herein can be used in addition to the subject bis-phosphonic acid ethers. Such water treatment additives are, for example, biocides, lignin derivatives, polymeric agents (e.g. copolymers of 2-acrylamido-2-methylpropane sulfonic acid and methacrylic acid or polymers of acrylic acid), yellow metal corrosion inhibitors (e.g. benzotriazole), and the like.

Of particular note are combinations of the bis-phosphonic acid ethers of this invention with phosphonates, especially hydroxymethylphosphonic acid and its water soluble salts. We have found that the bis-phosphonic acid ethers interact with hydroxymethylphosphonic acid to provide especially effective corrosion protection. In this embodiment the hydroxymethylphosphonic acid compound and the bis-phosphonic acid ether may be provided as a single composition. In general, for this embodiment the weight ratio of hydroxymethylphosphonic acid compound to bis-phosphonic acid ether in the composition should fall within the range of about 1:10 to about 10:1. The preferred weight ratio of bis-phosphonic acid ether to hydroxymethylphosphonic acid compound is about 1:3 or more; more preferably at least about 2:3.

The bis-phosphonic acid ether and hydroxymethylphosphonic acid compound may be added to the system water in the form of a composition. For example a concentrated solution comprising the two components (preferably containing between 1 and 50 total weight percent of the bis-phosphonic acid ethers and the hydroxymethylphosphonic acid compound) may be added to the system water. Alternatively, the bis-phosphonic acid ethers and the hydroxymethyl phosphonic acid compound can be each separately added directly to the aqueous system preferably in accordance with the weight ratios indicated above to allow the formation of the subject composition in situ in the aqueous system. It is believed, although not made a limitation of the instant invention, that the bis-phosphonic acid ethers and the hydroxymethylphosphonic acid compounds interact to attain the achieved corrosion inhibition which results are not attainable by use of each of the individual components.

Practice of this aspect of the invention will become further apparent from the following non-limiting examples.

EXAMPLE II

A series of three runs (runs 24 through 26) was made using the same procedure as the runs in Example I, except equal amounts of EDPME and HMPA (10 ppm, 15 ppm and 20 ppm each respectively for the three runs) were added to standard corrosive test water. The percent corrosion inhibition compared to run 1 of Example I which used only the standard corrosive test water is shown in Table II.

A series of 9 runs (runs 27 through 35) was made using a mixture of equal amounts of hydroxymethylphosphonic acid (i.e. "HMPA") and di-(phosphonomethyl) formal (i.e. "DPMF") prepared generally in accordance with the procedure illustrated above, as the corrosion inhibitor. The percent corrosion inhibitor using each component at 12.5 ppm (runs 27 and 28), 15 ppm (runs 29 through 33), 20 ppm (run 34), and 25 ppm (run 35) is shown in Table II.

A series of 3 runs (runs 36 through 38) was made using a mixture of HMPA and bis-(2-phosphonomethoxyethyl) ether (i.e. "BPMEE") prepared generally in accordance with the procedure illustrated above, as the corrosion inhibitor. The mixture had a weight ratio of HMPA to BPMEE of about 1:9. The percent corrosion inhibitor using a total concentration of both compounds of 24 ppm (run 36), 36 ppm (run 37), and 47 ppm (run 38) is shown in Table II.

TABLE II

| Run No. | Corrosion Inhibitors | Total Inhibitor Dosage (ppm) | Percent Reduction in Corrosion Rate | |
|---|---|---|---|---|
| | | | Recirculation Line | Reservoir |
| 24 | EDPME/HMPA (1:1) | 20 | 66 | 39 |
| 25 | EDPME/HMPA (1:1) | 30 | 94 | 42 |
| 26 | EDPME/HMPA (1:1) | 40 | 95 | 44 |
| 27 | DPMF/HMPA (1:1) | 25 | 87 | 35 |
| 28 | DPMF/HMPA (1:1) | 25 | 87 | 25 |
| 29 | DPMF/HMPA (1:1) | 30 | 78 | 53 |
| 30 | DPMF/HMPA (1:1) | 30 | 94 | 4 |
| 31 | DPMF/HMPA (1:1) | 30 | 98 | 15 |
| 32 | DPMF/HMPA (1:1) | 30 | 93 | 3 |
| 33 | DPMF/HMPA (1:1) | 30 | 90 | −3 |
| 34 | DPMF/HMPA (1:1) | 40 | 99 | 36 |
| 35 | DPMF/HMPA (1:1) | 50 | 99 | 68 |
| 36 | BPMEE/HMPA (9:1) | 24 | 60 | 22 |
| 37 | BPMEE/HMPA (9:1) | 36 | 97 | 17 |
| 38 | BPMEE/HMPA (9:1) | 47 | 96 | 71 |

The Examples describe particular embodiments of the invention. Other embodiments will become apparent to those skilled in the art from a consideration of the specification or practice of the invention disclosed herein. It is understood that modifications and variations may be produced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A process for inhibiting corrosion of an iron based metal in contact with the system water in an aqueous system comprising incorporating into the system water an effective amount of bis-phosphonic acid ethers selected from the group consisting of compounds having the formula

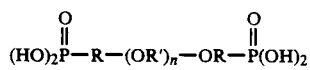

wherein each R is independently selected from the group consisting of methylene and ethylene, wherein R' is selected from the group consisting of methylene, ethylene, and ethylene substituted with one or more methyl groups, and wherein n is an integer from 0 to 4, and water soluble salts of said bis-phosphonic acid ethers.

2. A process according to claim 1 wherein a concentration of from about 0.5 to about 10,000 ppm of said compounds is maintained in the system water.

3. A process according to claim 1 wherein the compounds are selected from those in which n is 1 and R' is ethylene or ethylene substituted with one or more methyl groups.

4. A process according to claim 2 wherein the compounds are selected from ethyleneglycol di-(phosphonomethyl) ether and its alkali metal salts.

5. A process according to claim 1 wherein the compounds are selected from those in which R' is ethylene or ethylene substituted with one or more methyl groups, and n is 2.

6. A process according to claim 5 wherein the compounds are selected from bis-(2-phosphonomethoxyethyl) ether and its alkali metal salts.

7. A process according to claim 1 wherein the compounds are selected from those in which n is 1, R is methylene and R' is methylene.

8. A process according to claim 6 wherein the compounds are selected from di-(phosphonomethyl) formal and its alkali metal salts.

9. A process according to claim 1 wherein the compounds are selected from those in which n is 0 and R is methylene.

10. A process according to claim 8 wherein the compounds are selected from bis-(phosphonomethyl) ether and its alkali metal salts.

11. A process according to claim 1 wherein the compounds are selected from those in which n is 0 and R is ethylene.

12. A process according to claim 11 wherein the compounds are selected from bis-(2-phosphonoethyl) ether and its alkali metal salts.

13. A process according to claim 1 wherein a phosphonate selected from the group consisting of hydroxymethylphosphonic acid and its water soluble salts is also added to the system water.

14. A process according to claim 13 wherein the weight ratio of the hydroxymethylphosphonic acid compound added to the bis-phosphonic acid ether compound added is within the range of about 10:1 to about 1:10.

15. A process according to claim 14 wherein the compounds are selected from those in which n is 1 and R' is ethylene or ethylene substituted with one or more methyl groups.

16. A process according to claim 15 wherein the compounds are selected from ethyleneglycol di-(phosphonomethyl) ether and its alkali metal salts.

17. A process according to claim 14 wherein the compounds are selected from those in which R' is ethylene or ethylene substituted with one or more methyl groups, and n is 2.

18. A process according to claim 17 wherein the compounds are selected from bis-(2-phosphonomethoxyethyl) ether and its alkali metal salts.

19. A process according to claim 14 wherein the compounds are selected from those in which n is 1, R is methylene and R' is methylene.

20. A process according to claim 19 wherein the compounds are selected from di-(phosphonomethyl) formal and its alkali metal salts.

21. A process according to claim 14 wherein the compounds are selected from those in which n is 0 and R is methylene.

22. A process according to claim 21 wherein the compounds are selected from bis-(phosphonomethyl) ether and its alkali metal salts.

23. A process according to claim 14 wherein the compounds are selected from those in which n is 0 and R is ethylene.

24. A process according to claim 23 wherein the compounds are selected from bis-(2-phosphonoethyl) ether and its alkali metal salts.

* * * * *

UNITED STATES PATENT AND TRADEMARK OFFICE
CERTIFICATE OF CORRECTION

PATENT NO. : 4,981,648

DATED : January 1, 1991

INVENTOR(S) : Kumar et al

It is certified that error appears in the above-identified patent and that said Letters Patent is hereby corrected as shown below:

Column 11, line 20, "claim 2" should read --claim 3--.
          line 34, "claim 6" should read --claim 7--.
          line 40, "claim 8" should read --claim 9--.

Signed and Sealed this

Twenty-eighth Day of April, 1992

Attest:

HARRY F. MANBECK, JR.

*Attesting Officer*      *Commissioner of Patents and Trademarks*